(12) United States Patent
Orologio

(10) Patent No.: US 10,828,863 B2
(45) Date of Patent: *Nov. 10, 2020

(54) THERMALLY INSULATED SHEET

(71) Applicant: Furio Orologio, Etobicoke (CA)

(72) Inventor: Furio Orologio, Etobicoke (CA)

(*) Notice: Subject to any disclaimer, the term of this patent is extended or adjusted under 35 U.S.C. 154(b) by 140 days.

This patent is subject to a terminal disclaimer.

(21) Appl. No.: 16/134,375

(22) Filed: Sep. 18, 2018

(65) Prior Publication Data

US 2019/0134941 A1    May 9, 2019

Related U.S. Application Data

(63) Continuation-in-part of application No. 15/462,008, filed on Mar. 17, 2017, now Pat. No. 10,112,364.
(Continued)

(30) Foreign Application Priority Data

Sep. 19, 2014  (CA) ........................... 2864232
Oct. 3, 2014  (CA) ........................... 2866654

(51) Int. Cl.
  *B32B 3/24* (2006.01)
  *B32B 3/26* (2006.01)
  (Continued)

(52) U.S. Cl.
  CPC .............. *B32B 3/266* (2013.01); *B32B 15/20* (2013.01); *B32B 27/08* (2013.01); *B32B 2255/10* (2013.01); *B32B 2255/205* (2013.01); *B32B 2307/304* (2013.01); *B32B 2419/00* (2013.01); *E04B 1/625* (2013.01); *E04B 1/806* (2013.01);
  (Continued)

(58) Field of Classification Search
  CPC ............. B32B 3/266; Y10T 428/24322; Y10T 428/24273
  See application file for complete search history.

(56) References Cited

U.S. PATENT DOCUMENTS 3,577,305 A    5/1971  Engle et al.
4,685,155 A    8/1987  Fingerhut et al.
(Continued)

FOREIGN PATENT DOCUMENTS

CA    2218282 A1    6/1999
CA    2554754       12/2007
(Continued)

OTHER PUBLICATIONS

Canadian Examiner Report dated Jun. 22, 2016 for CA 2,923,128 (4 Pages).
(Continued)

*Primary Examiner* — William P Watkins, III
(74) *Attorney, Agent, or Firm* — Greer, Burns & Crain, Ltd.

(57) ABSTRACT

A thermally insulating sheet for installation adjacent a surface of an object comprising a reflective metalized polymeric insulation material having moisture vapour transference properties. An apparatus and methods for producing a reflective metalized polymeric thermally insulating assembly having moisture vapour transference properties are also provided. The insulation material provides enhanced thermal retention.

20 Claims, 14 Drawing Sheets

Related U.S. Application Data which is a continuation of application No. PCT/CA2015/050921, filed on Sep. 18, 2015.

(51) Int. Cl.
  *B32B 27/08* (2006.01)
  *B32B 15/20* (2006.01)
  *E04B 1/62* (2006.01)
  *E04B 1/76* (2006.01)
  *E04B 1/80* (2006.01)

(52) U.S. Cl.
  CPC .............. *E04B 2001/7691* (2013.01); *Y10T 428/24273* (2015.01); *Y10T 428/24322* (2015.01)

(56) References Cited

U.S. PATENT DOCUMENTS

| | | | |
|---|---|---|---|
| 5,787,502 | A | 8/1998 | Middleton |
| 6,191,221 | B1 | 2/2001 | McAmish et al. |
| 6,322,873 | B1 | 11/2001 | Orologio |
| 6,562,439 | B2 | 5/2003 | Orologio |
| 10,112,364 | B2 * | 10/2018 | Orologio ............... B32B 5/028 |
| 2004/0159011 | A1 | 8/2004 | Gordon |
| 2006/0057918 | A1 | 3/2006 | Burnett |
| 2006/0135019 | A1 | 6/2006 | Russell et al. |
| 2007/0245664 | A1 | 10/2007 | Orologio |
| 2011/0131700 | A1 | 6/2011 | Tsui et al. |
| 2011/0203028 | A1 | 8/2011 | Orologio |
| 2013/0216774 | A1 | 8/2013 | Conolly et al. |

FOREIGN PATENT DOCUMENTS

| | | |
|---|---|---|
| CA | 2923128 C | 2/2017 |
| EP | 1974619 A1 | 10/2008 |
| GB | 2346581 B | 9/2003 |
| GB | 2501053 | 10/2013 |
| WO | 1995022262 A1 | 8/1995 |
| WO | 2005099496 A2 | 10/2005 |
| WO | 2006026728 A2 | 3/2006 |

OTHER PUBLICATIONS

Canadian Examiner Report dated Sep. 23, 2016 for CA 2,923,128 (3 Pages).
Extended European Search Report for European Application Serial No. 15841363.3, dated Oct. 25, 2017 (7 pages).
International Search Report for International Patent Application SN: PCT/CA2015/050921, dated Nov. 16, 2015 (6 pages).
Transmittal of International Search Report and Written Opinion for International Patent Application SN: PCT/CA2015/050921, dated Nov. 16, 2015 (1 Page).
Written Opinion for International Patent Application SN: PCT/CA2015/050921, dated Nov. 16, 2015 (7 pages).

* cited by examiner

THERMALLY INSULATED SHEET

RELATED APPLICATIONS

The present application is a U.S. Continuation-in-Part application of U.S. Continuation application Ser. No. 15/462,008, filed Mar. 17, 2017 which is a continuation of International Patent Application serial number PCT/CA2015/050921 entitled "THERMALLY INSULATED PERSONAL ARTICLE AND SLEEPING BAG LINERS", filed Sep. 18, 2015 which in turn claims benefit of priority to Canadian Patent Application serial number 2,864,232 entitled "THERMALLY INSULATED PERSONAL ARTICLE", filed Sep. 19, 2014, and to Canadian Patent Application serial number 2,866,654 entitled "THERMALLY INSULATED PERSONAL ARTICLE", filed Oct. 3, 2014, each of which is incorporated herein by reference in its entirety.

FIELD OF THE DISCLOSURE

This invention relates to a breathable insulation sheet for thermally insulating objects particularly buildings or parts thereof and an apparatus and method for forming such an insulative sheet.

BACKGROUND

House wraps and sheets for location adjacent an object surface have been used and can be effective in preventing water, such as from wind driven rain, from substantially contacting a surface. However, these are not necessarily effective at providing a degree of insulative properties to the object or building enclosure so as to inhibit the transfer of heat.

Generally, during building construction, a house wrap is generally installed over the sheathing and behind the exterior which may be vinyl, wood clapboard, cedar shingles or a brick façade among other known building exterior coverings known in the art. In most cases, the house wrap, generally, is the last line of defense in stopping incoming water or exterior water condensation from getting into the wooden stud wall. A house wrap may be defined as inclusive of all materials, including synthetic materials, effectively designed for the replacement of traditional sheathing tar paper. A conventional house-wrap functions as a moisture barrier, preventing rain from getting into the stud wall construction while allowing moisture vapor to pass out from the building to the exterior. If moisture is allowed to build up within stud or cavity walls, or exterior sheeting, mold and rot can set in and destroy the structural materials, and other materials, of a building or object. Furthermore, moisture may accumulate within the insulation, such as fiberglass or cellulose insulation and thus the insulation may lose at least some of its R-value due to heat-conducting moisture.

Conventional house wraps such as asphalt-impregnated paper or fiberglass; micro-perforated; cross-lapped films; films laminated to spun-bond non-woven materials; and films laminated or coated to polypropylene woven materials are known. However, these known house-wrap materials have little no R-value and thus provide little or no insulating value to the object or building around which they wrap.

In order to be breathable so as to inhibit the accumulation of moisture, house wraps must generally have a high moisture vapor transmission rate (MVTR) to be effective. Additionally, house wraps generally require a waterproof aspect so as inhibit moisture or water from exterior the building or object enclosure from substantially contacting and accumulation on the exterior sheeting or within stud cavities. Therefore, house wraps should generally allow the transference of moisture from one side thereof, across the wrap material and to the exterior of the building while also being substantially resistance to moisture travelling from an exterior side to contact the building sheeting as well as resistance to wind.

In terms of well-known commercially available house wraps, The DuPont Company has long been manufacturing and providing to the marketplace its TYVEK® brand of house wrap. The TYVEK® brand of house wrap has been described as being "a sheet of very fine, high-density polyethylene fibers" which provides a degree of wind and water protection to the building sheeting and also allowing breathability to the building. However, TYVEK® has little or no insulating R-value.

Reflective metal polymeric insulation materials are also known in the construction industry, particularly for use in residential, commercial, and industrial buildings and establishments, wherein the insulation material is to be located adjacent frame structures, walls, crawl spaces, ceilings, around water heaters and pipes and under concrete floors and roads. Examples of such uses are disclosed in U.S. Pat. No. 6,322,873—issued Nov. 27, 2001 to Orologio, Furio and U.S. Pat. No. 6,562,439—issued May 13, 2003 to Orologio, Furio; and Canadian Patent No. 2,554,754—issued Dec. 4, 2007 to Orologio, Furio.

U.S. Pat. No. 4,685,155 entitled "Composite Insulation Material", issued Aug. 11, 1987 to Fingerhut et al., describes a composite insulative sheet having a substantially continuous internal layer of porous material having low heat conductivity. A flexible sheet of liquid impermeable material is adhered to both sides of the internal continuous layer of porous material. The sheets of liquid impermeable material adhered to both sides of the internal continuous layer of porous material have tapered capillary openings with each having a base open to the internal layer of porous material and an apex extending away from the opposite surface of the flexible sheet. Thus, the tapered capillary openings of each of the sheets of liquid impermeable material are arranged such that the apexes of each of the tapered capillary openings face away from each other and the bases are arranged on either side of the internal layer of porous material, towards each other.

This background information is provided to reveal information believed by the applicant to be of possible relevance. No admission is necessarily intended, nor should be construed, that any of the preceding information constitutes prior art or forms part of the general common knowledge in the relevant art.

SUMMARY

Although the use of insulating materials composed of a bubble layer having "air-pockets" containing a gas having adhered thereto a metal foil or metalized layer are known, there are certain drawbacks. For example, in the pursuit to retain heat on an inside of an object at least partially covered with an insulating material, such as a metal foil or metalized bubble-pack insulative material moisture can build-up inside the interior side and thus causing the dampness and in certain conditions rot of the building materials. The instant invention provides metal foil or metalized insulative bubble-pack materials which allows the transmission of moisture vapour from the interior of the metal foil or metalized bubble-pack insulative layer to escape while inhibiting moisture and/or air from an exterior side to enter. The invention also provides an apparatus and a method to produce such a metal foil or metalized bubble-pack insulative material having moisture transference properties. In another aspect the invention provides insulative bubble-pack materials wherein the transference of moisture vapour is substantially in one direction.

As used herein with reference to the invention, the term 'metalized' includes, but is not so limited to metals in the form of a foil and to particulate metals deposited by vapour or from solution.

The following presents a simplified summary of the general inventive concept herein to provide a basic understanding of some aspects of the invention. This summary is not an extensive overview of the invention. It is not intended to restrict key or critical elements of the invention or to delineate the scope of the invention beyond that explicitly or implicitly described by the following description and claims.

The present invention provides an insulated layer of a reflective metal foil or metalized polymeric insulating material having substantially one-way moisture transference properties. Accordingly, apertures located in the insulating layer allow the moisture to pass from one side of the insulating layer, while substantially inhibiting the passage of moisture and air in the opposing direction across the insulated layer. For example, the apertures may frusto-conically shaped, thus having broader opening base dimension and a narrower apex opening dimension.

The layer of insulating material may be adhered or coupled to an object or building with the apertures being arranged such that a broader opening base dimension is located adjacent the object or building and the narrow apex dimension is facing away from the object or building.

Accordingly, in one aspect, the instant disclosure provides a thermally insulating sheet of a reflective metal foil or metalized polymeric insulation material for insulating an object where the thermally insulating sheet, in use is located adjacent to a surface the object. The reflective metal foil or metalized polymeric insulation material includes a plurality of one-way moisture transference frusto-conically shaped apertures provided in an effective array, size, number and suitable location so as to effect expulsion of moisture vapour through the frusto-conically shaped apertures from a side of the thermally insulating sheet located adjacent the object without ingress of external air through the apertures. The reflective polymeric insulation material may be characterized in having a plurality of frusto-conically shaped apertures where the frusto-conically shaped apertures are suitably sized and located so as to allow transference of moisture vapour through the frusto-conically shaped apertures from the object without the ingress of external air through the apertures. The frusto-conically shaped apertures are provided wherein the narrower dimension is orientated distal to the surface of the object, in use. Therefore, the apertures allow substantially one-way moisture vapour transference.

Preferably, the insulation material comprises a foam material wherein the foam material is a closed cell foam, polyethylene foam, polypropylene foam and expanded polystyrene foam, multi-film layered assembly, or a bubble pack.

Preferably, the disclosure provides a thermally insulating layer wherein the reflective metal foil or metalized polymeric insulation material comprises a first thermoplastic film having a plurality of portions wherein each of the portions defines a cavity; a second thermoplastic film in sealed engagement with the first film to provide a plurality of closed cavities. Furthermore, the invention provides a plurality of frusto-conically shaped apertures interposed between the plurality of closed cavities. In some embodiments, the invention also provides that the plurality of apertures may be formed through the closed cavities. Therefore, a radiant barrier is provided.

In another aspect, there is provide an object having an outer surface comprising a thermally insulating sheet of a reflective metalized polymeric insulation material located adjacent to the outer surface. The reflective metalized polymeric insulation material comprises a first bubble pack assembly including a first thermoplastic film having a plurality of portions wherein each of the portions defines a cavity and a second thermoplastic film in sealed engagement with the first thermoplastic film to provide a plurality of closed-cell cavities. The reflective metalized polymeric insulation material is further characterized in having a plurality of frusto-conically shaped apertures suitably sized and interposed between the closed-cell cavities such that the thermally insulating sheet has the narrower dimension of each of the frusto-conically shaped apertures oriented distal to the outer surface so as to effect transference of moisture vapour through the frusto-conically shaped apertures from outer surface without substantial ingress of external air through the apertures. Each of the plurality of frusto-conically shaped apertures is defined by a proximal opening and a distal opening with a continuous perimeter aperture wall extending therebetween. The frusto-conically shaped aperture wall is substantially linear and inclined between the proximal opening and the distal opening such that the proximal opening has a greater area than the distal opening and wherein within any thermally insulating layer of a reflective metalized polymeric insulation material having frusto-conically shaped apertures, the narrower dimension of each of the frusto-conically shaped apertures is oriented distal to the object.

In some embodiments, frusto-conically shaped apertures allow substantially one-way moisture vapour transference.

In some embodiments, frusto-conically shaped apertures are provided in an effective number and array so as to allow effective moisture transference.

In some embodiments, the frusto-conically shaped apertures are also formed through a portion of the closed-cell cavities.

In some embodiments, the reflective metalized polymeric insulation material comprises an assembly comprising the reflective metalized bubble pack; a second reflective metalized bubble pack with a first plurality of intervening bubble spacers suitably located between the first and the second bubble packs so as to define at least one inner insulative air chamber between the first and second bubble packs. In some embodiments, there is provided at least one insulative air chamber aperture for permitting the transference of moisture vapour across the at least one inner insulative air chamber. In some embodiments, the at least one insulative air chamber aperture allows substantially one-way moisture vapour transference. In some embodiments, the at least one insulative air chamber aperture is frusto-conically shaped.

In some embodiments, the frusto-conically shaped apertures are formed through the first thermoplastic film and any adjacently located metalizing layer and a plurality of apertures are formed through the second thermoplastic film. Furthermore, in some embodiments, the second thermoplastic layer may have an adjacent second metalizing layer where the apertures are also formed through the second metalizing layer.

In another aspect, there is provided a thermally insulative sheet for surrounding an object or part thereof comprising a reflective metal polymeric bubble pack insulation assembly. The reflective metal polymeric bubble pack insulation includes a first thermoplastic film having a plurality of portions wherein each of the portions defines a cavity and a second thermoplastic film in sealed engagement with the first thermoplastic film to provide a plurality of closed-cell cavities. The thermally insulative sheet is further characterized in having a plurality of frusto-conically shaped apertures suitably sized and interposed between the closed-cell cavities such that the narrower dimension of each of the frusto-conically shaped apertures is oriented distal to the object so as to effect transference of moisture vapour through the frusto-conically shaped apertures from the object through the thermally insulative sheet without substantial ingress of external air through the frusto-conically shaped apertures. Each of the plurality of frusto-conically shaped apertures being defined by a proximal opening and a distal opening with a continuous perimeter aperture wall extending therebetween. The frusto-conically shaped aperture wall is substantially linear and inclined between the proximal opening and the distal opening such that the proximal opening has a greater area than the distal opening and wherein within any of the reflective metal polymeric bubble pack insulation having frusto-conically shaped apertures, the narrower dimension of each of the frusto-conically shaped apertures is oriented distal to the object or part thereof, in use.

In some embodiments, the bubbles have diameter of greater than ½" and a height of greater than 3/16". In some embodiments, the bubbles have a diameter of less than ½" and a height of less than 3/16".

In some embodiments, a reflective side of the reflective metal polymeric bubble pack insulation assembly is oriented to face toward a surface of the object or part thereof. Alternatively, in some embodiments, a reflective side of the reflective metal polymeric bubble pack insulation assembly is oriented to face away from a surface of the object or part thereof.

In some embodiments, the thermally insulative casing further comprises a second reflective metal polymeric bubble pack assembly in communication with the reflective metal polymeric bubble pack insulation and there is provided a first plurality of intervening bubble spacers suitably located between the first and the second reflective metal polymeric bubble packs so as to define at least one inner insulative air chamber between the first and second reflective metal polymeric bubble packs. In some embodiments, the reflective metal polymeric bubble pack insulation assembly further includes at least one insulative air chamber aperture for permitting the transference of moisture vapour across the at least one inner insulative air chamber. In some embodiments, insulative air chamber aperture is frusto-conically shaped.

In some embodiments, the frusto-conically shaped apertures are formed through the first thermoplastic film and any adjacently located metalizing layer and a plurality of apertures are formed through the second thermoplastic film. Furthermore, in some embodiments, the second thermoplastic layer has an adjacent second metalizing layer where the apertures are also formed through the second metalizing layer.

In further some embodiments, the invention provides a thermally insulating sheet comprising a reflective metal foil or metalized polymeric thermally insulating assembly or radiant barrier having:
(i) a first bubble pack having a first thermoplastic film having a plurality of portions wherein each of the portions defines a cavity and a second thermoplastic film in sealed engagement with the first thermoplastic film to provide a plurality of closed the cavities; and
(ii) a second bubble-pack having a third thermoplastic film having a plurality of portions wherein each of the portions defines a cavity and a fourth thermoplastic film in sealed engagement with the third thermoplastic film to provide a plurality of closed the cavities;
(iii) a metal foil or metalized layer or metalized thermoplastic film interposed between and bonded to the first bubble pack and the second bubble pack; and
(iv) a plurality of substantially one-way moisture vapour transference apertures interposed between the cavities and/or through the cavities, and across the metal foil or metalized layer or metalized thermoplastic film, the moisture vapour transference apertures being frusto-conically shaped apertures and defined by a proximal opening and a distal opening with a continuous perimeter aperture wall extending therebetween, the aperture wall being substantially linear and inclined between the proximal opening and the distal opening such that the proximal opening has a greater area than the distal opening; and wherein in use the frusto-conically shaped apertures are oriented relative to an object surface as having the narrower dimension of each of the frusto-conically shaped apertures is oriented distal to the object or part thereof.

In further embodiments, the reflective metal foil or metalized polymeric insulation material comprises an assembly including a first reflective metal foil or metalized bubble pack and a second reflective metal foil or metalized bubble pack having a first plurality of intervening bubble spacers suitably located between the first and the second bubble packs so as to define at least one inner insulative air chamber between the first and second bubble packs. At least one insulative air chamber aperture is provided for permitting the transference of moisture vapour across the insulative air chamber in substantially one direction. Furthermore, the insulative air chamber aperture may be frusto-conically shaped; therefore, providing a radiant barrier.

The thickness and location of the insulative sheet, material or assemblies may be selected dependent on the particular object to be insulated. A thickness of the insulative layer material for insulating an object, for example, may be selected according to the intended application use and environment where the object may be located.

In another aspect of the disclosure, there is provided an apparatus for forming a reflective metal foil or metalized polymeric thermally insulating assembly or radiant barrier having moisture vapour transference properties. The apparatus comprises an endless movable conveyor mold having surfaces defining cavities for receiving therein a first film of thermoplastic material and a heater for heating the first film to a temperature just below a melting temperature thereof. A vacuum inlet is also provided in each cavity for pulling a portion of the first film into each cavity. A first nip roller for melding and bonding a second film of a thermoplastic material in a layered arrangement to the first film so as to form bubbles and melding and bonding a first metal foil or metalized polyester sheet to the second film is provided. Additionally, a second nip roller for melding and bonding a third film of thermoplastic material, having melded and bonded thereto a second metal foil or metalized polyester sheet, to the bubbles so as to form a metal foil or metalized polymeric cavity-filled bubble insulation is provided. In some embodiments, the second nip roller may have a plurality of projections for pre-forming frusto-conically shaped apertures and/or apertures in the third film of thermoplastic material, having melded and bonded thereto a second metal foil or metalized polyester sheet. In order to provide frusto-conically shaped apertures in the spaces interposed between the bubbles and/or through the bubbles, an aperture forming roller having a plurality of projections for piercing the metal foil or metalized polymeric cavity-filled bubble insulation located about the periphery is also provided. In some embodiments, the plurality of projections of the second nip roller may be provided so as to make clusters of frusto-conically shaped apertures at desired locations.

With reference to the apparatus noted above, the endless movable conveyor mold and the aperture forming roller are synchronized such that the projections pierce only the desired areas, either through the spaces interposed between the bubbles and/or through the bubbles, so as to provide a desired number and array of apertures per given unit area of thermally insulating metal foil or metalized bubble-pack.

The projections may be heated or non-heated. Preferably, the projections are needle-like in shape so as to form frusto-conically shaped apertures. The projections of the second nip roller may be provided to form frusto-conically shaped apertures and/or apertures.

In another aspect of the disclosure there is provided a method for forming a reflective metal foil or metalized polymeric thermally insulating assembly or radiant barrier having moisture vapour transference properties. The method including:

providing an endless movable conveyor mold having surfaces defining cavities, placing a first film of thermoplastic material on the mold;
heating the first film to a temperature just below a melting temperature thereof, providing a vacuum at each cavity to pull the film into each cavity;
providing a second film of thermoplastic material in a layered arrangement onto the first film;
providing a first metal foil or metalized polyester sheet in a layered arrangement onto the second film;
melding and bonding the second film to the first film to form bubbles and melding and bonding the first metal foil or metalized polyester sheet to the second film;
providing and heating a third film of thermoplastic material and a second metal foil or metalized polyester sheet melded and bonded together;
melding and bonding the third film to the bubbles so as to form a metal foil or metalized polymeric cavity-filled bubble insulation; and
forming frusto-conically shaped apertures and/or apertures through at least some of the spaces interposed between the bubbles and/or through a portion of the bubbles.

The method preferably includes heating and pressing the second film to the first film and the second film to the first metal foil or metalized polyester sheet and the bubbles formed in the first film to the third film so as to effect bonding and melding. Furthermore, the frusto-conically shaped apertures are formed at locations interposed between the bubbles and/or through the bubbles with a heated or non-heated projection. Preferably, the apertures are frusto-conically formed by piercing the reflective metal foil or metalized polymeric thermally insulating assembly with a needle-like projection. In some embodiments of the method, the method further comprises forming or pre-forming apertures through the third film of thermoplastic material and the second metal foil or metalized polyester sheet.

BRIEF DESCRIPTION OF THE DRAWINGS

In order that the invention may be better understood, preferred embodiments will now be described by way of example only, with references to the accompanying drawings wherein.

DETAILED DESCRIPTION

Figure 1:
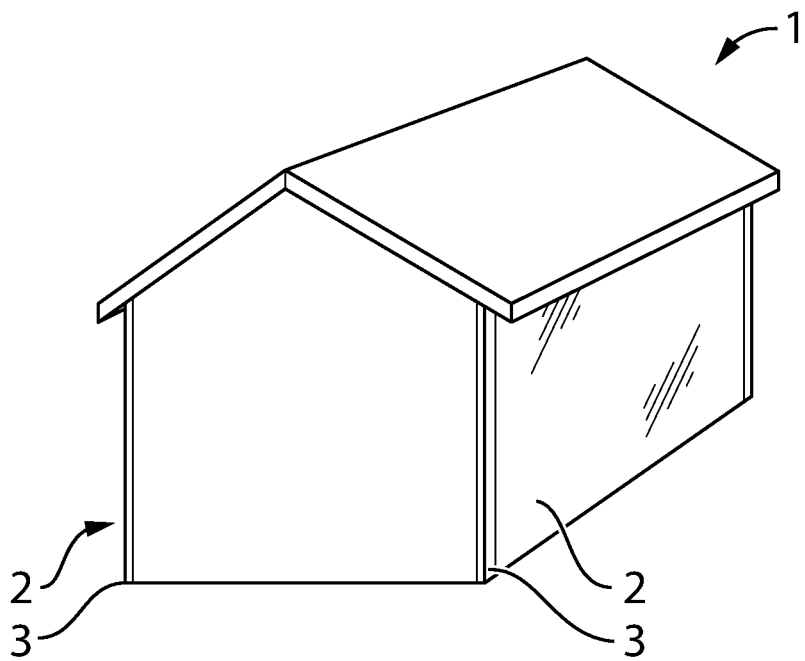
FIG. 1 is a diagrammatic representation of an object having a reflective metalized polymeric insulation material according to the invention located adjacent a surface.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "bonded," and "melded," and variations thereof herein are used broadly and encompass direct and indirect connections, bondings, and meldings. In addition, the terms "bonded" and "melded" and variations thereof are not restricted to physical or mechanical connections or couplings. Additionally, unless otherwise noted, the term "metalized" is used broadly to encompass "metals" (and vice versa), such as metal foils, metal depositions, and the like. Furthermore, and as described in subsequent paragraphs, the specific mechanical, other configurations illustrated in the drawings are intended to exemplify embodiments of the invention. However, other alternative mechanical or other configurations are possible which are considered to be within the teachings of the instant disclosure.

FIG. 1 shows generally at 1, an object having a reflective metalized polymeric insulation material or sheet 2 according to the invention located adjacent a surface 3 of the object. In some instances, the object may be a building having the reflective metalized polymeric insulation material 2 according to the invention located adjacent to an object surface 3 of the building.

Figure 2:
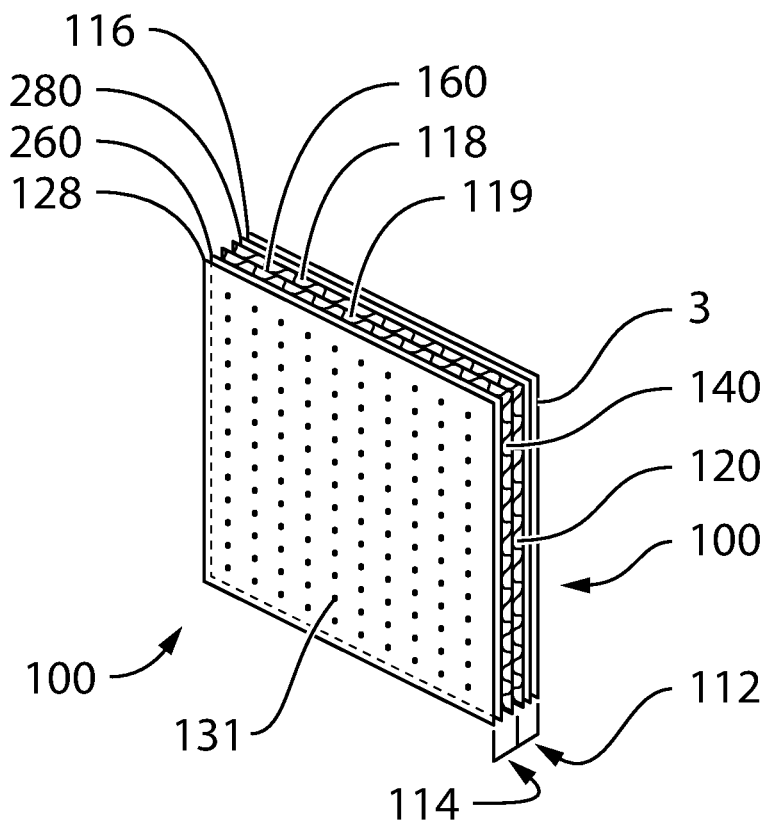
FIG. 2 is a diagrammatic perspective view of an insulating sheet (in part) according to the invention.

With reference to FIG. 2, this shows generally as 100, a double layer, bubble-pack with an aluminum foil insulation assembly, thus forming a radiant barrier, located adjacent to a surface 3. The double layer, bubble-pack with an aluminum foil insulation assembly 100 shown in FIG. 2, and other embodiments of the insulating material disclosure herein for location adjacent an object 2 may be adhered to the surface 3 by gluing, mechanical fastening or other suitable means. The double layer consists of a pair of bubble pack arrays 112, 114 bonded together through an intervening low-density polyethylene film 160. Arrays, 112, 114 are formed of a plurality of bubbles 119 or sealed cavities and spaces between the bubbles 118, from a 5-mil polyethylene film 116, 128, respectively. In some embodiments, such as shown for example in FIGS. 20 to 22, and further described with relation to the exemplary apparatus of FIG. 18, a predetermined number of bubbles 119 may be delated from the array. In the area where the deleted bubbles would have otherwise have been located in the bubble array, apertures 130 or 131 are provided and open to moisture to escape to the exterior. Each of films 116, 128, at their outer surfaces, is bonded to a reflective metal foil or reflective aluminum foil 260, 280, respectively, to provide the whole assembly with external aluminum surfaces.

Assembly 100 has approximately twenty, 1 cm diameter, 0.5 cm high bubbles per 30 cm length and breadth, given unit, within each of films 220, 240. However, in some embodiments, a desired number of bubbles may be deleted or otherwise not formed, as shown for example in FIGS. 20 to 22.

Figure 17:
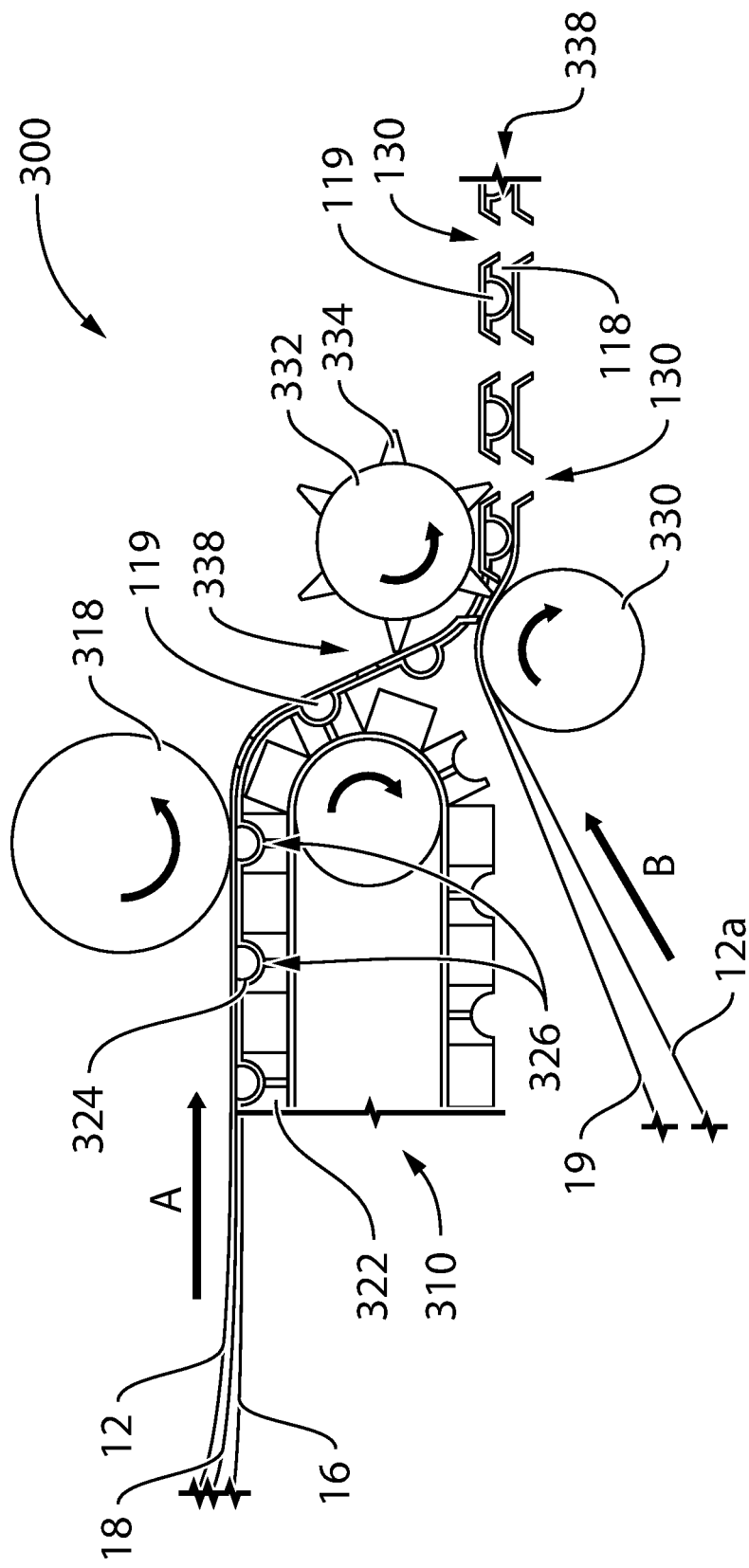
FIG. 17 is schematic side view of an exemplary apparatus for producing breathable reflective metalized insulation bubble pack assembly sheet.
Figure 18:
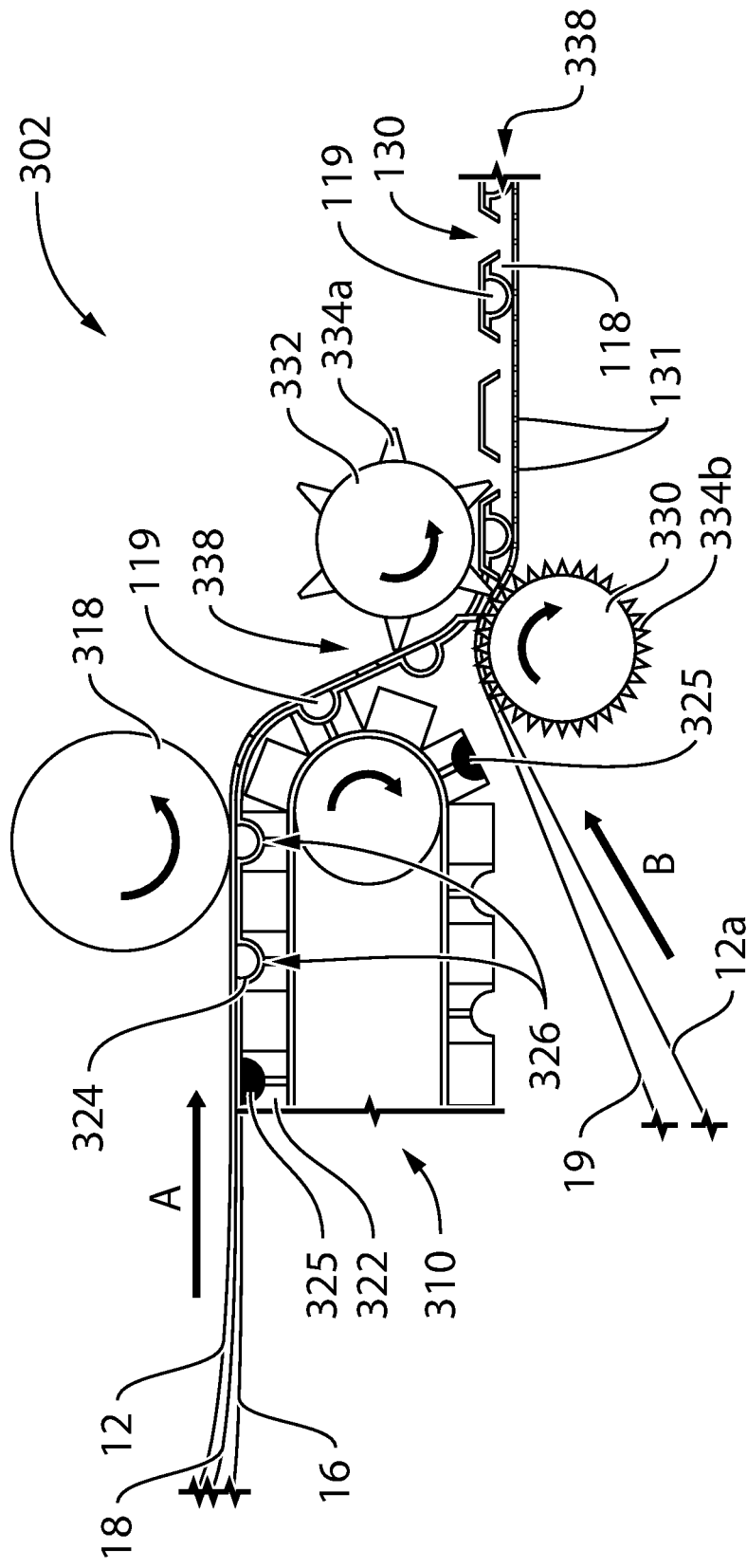
FIG. 18 is schematic side view of an exemplary apparatus for producing a breathable reflective metalized insulation bubble pack assembly sheet.

The aforesaid assembly 100 is made by a double hot roller thermal and vacuum forming process for cavity forming and lamination sealing techniques known in the art. Furthermore, a device for such a thermal and vacuum forming process is shown in FIGS. 17 and 18, generally at 300, and is discussed below.

Figure 3A:
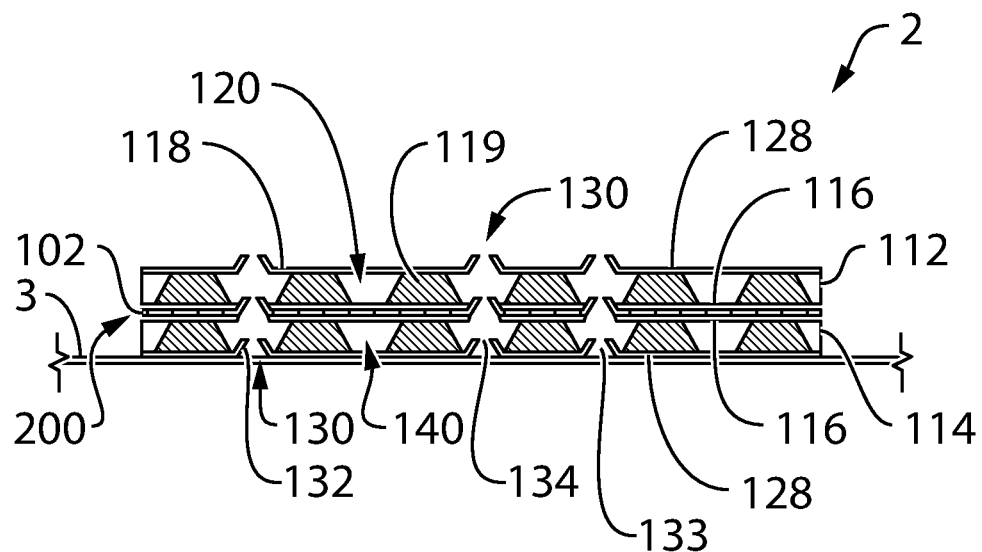
FIGS. 3A, 3B and 4 are diagrammatic cross-sectional views through a reflective metalized insulation bubble pack having an interposed aluminum foil or metalized polymeric film with apertures for use in the practice of the invention.
Figure 3B:
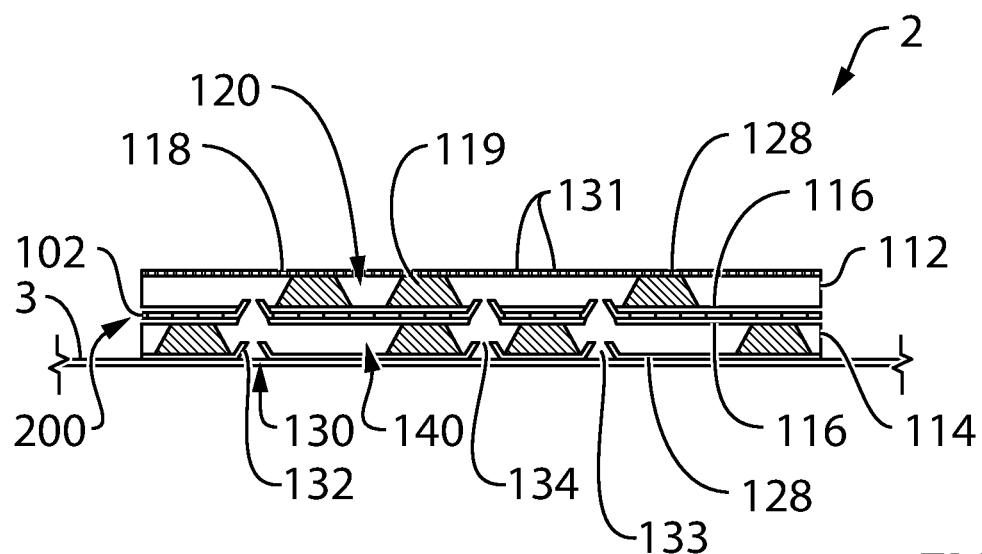
Figure 20:
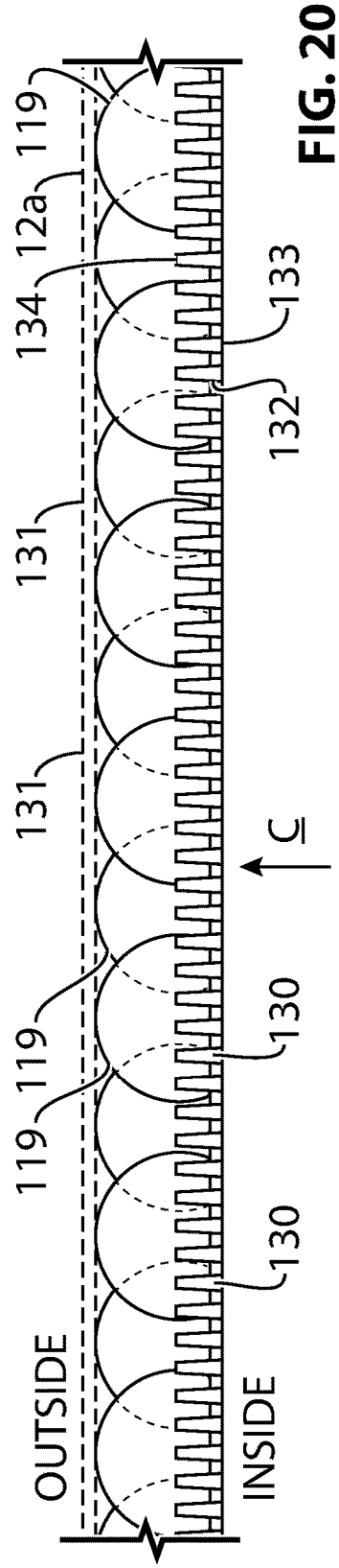
FIG. 20 is a schematic side view of section of an exemplary reflective metalized polymeric cavity-filled bubble insulation assembly having apertures formed therein which may formed by the schematically shown apparatus of FIG. 18.
Figure 21:
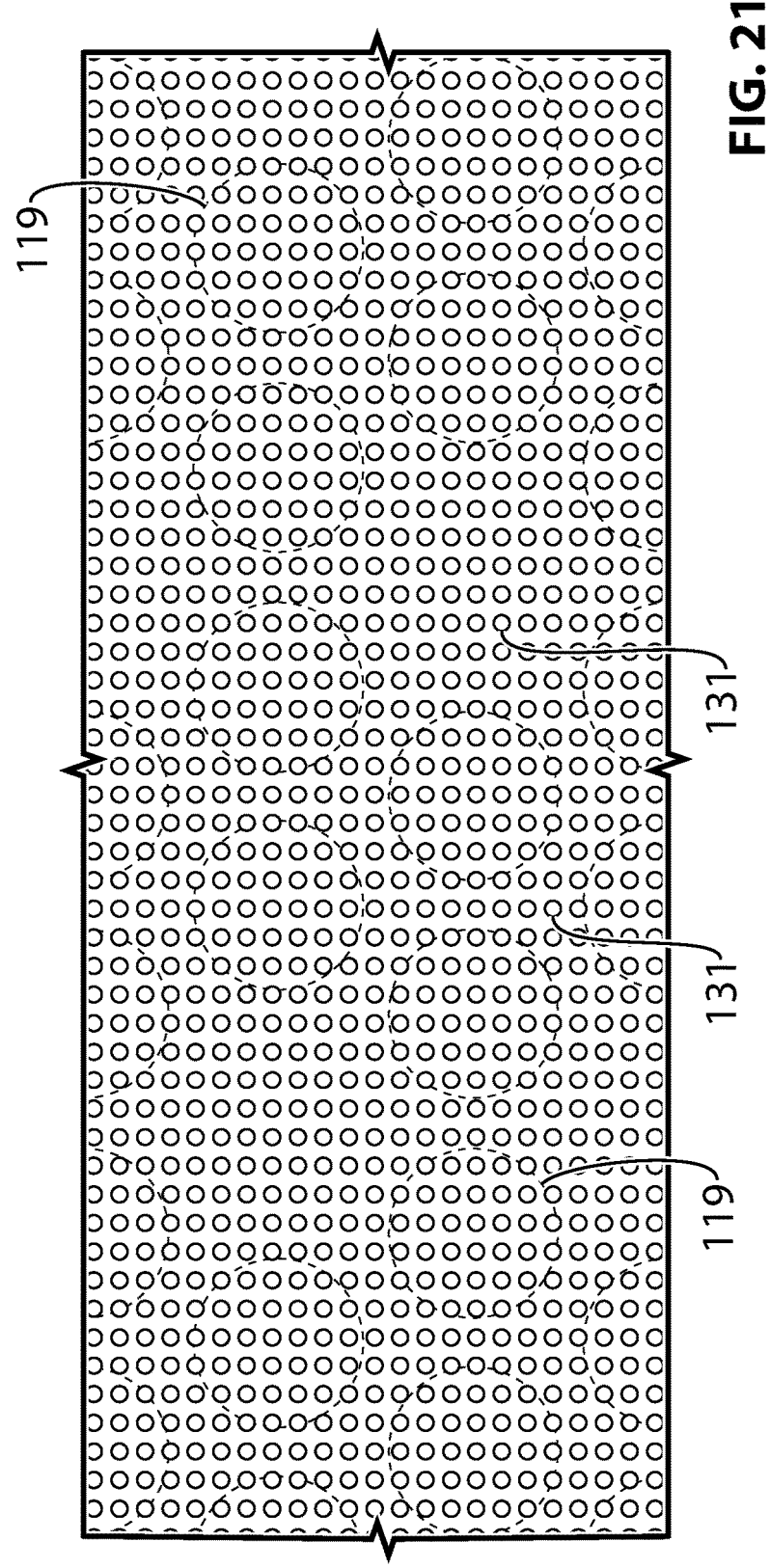
FIG. 21 is a plan view an exemplary reflective metalized polymeric cavity-filled bubble insulation assembly of FIG. 20 showing apertures formed in a top side.
Figure 22:
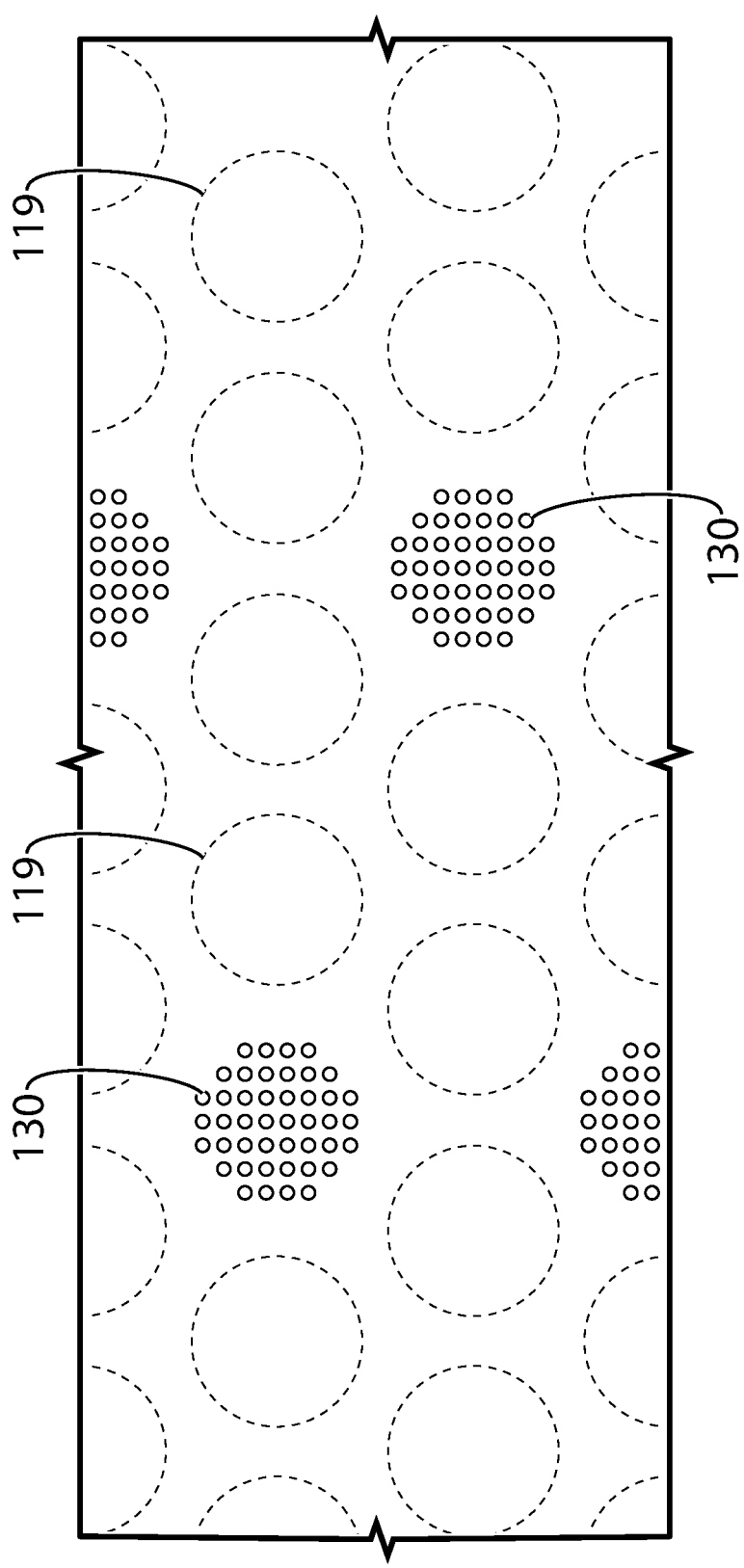
FIG. 22 is a bottom plan view an exemplary reflective metalized polymeric cavity-filled bubble insulation assembly of FIG. 20 showing frusto-conically shaped apertures formed in a bottom side.

With reference to FIGS. 3A and 3B, these figures generally show at 200 composite double bubble-pack assemblies, thus forming a radiant barrier, according embodiments of the invention, having a metal or aluminum foil 102 disposed between and bonded to bubble arrays 112 and 114 formed as for example the assembly shown in FIG. 2. Bubble layers 120 and 140 are encapsulated between polyethylene films 116 and 128, thus forming exemplary arrays. Frusto-conical apertures 130 are provided as interposed between the bubbles, as shown in FIGS. 3A and 3B. In some embodiments, the frusto-conical apertures 130 are provide through all layers, such as shown for example in FIG. 3A. However, in other some embodiments, such as shown in FIG. 3B, apertures 131 are provided wherein, in use, apertures 131 are oriented away from the object surface 3. For example, the frusto-conical apertures 130 may be provided so as to extend through spaces 118 between bubbles 119 and the aluminum foil 102. In some embodiments, such as that shown in FIG. 23C for example, the frusto-conical apertures 130 may be made through a certain number of the bubbles 119, or in relation to FIGS. 20 to 22, where a certain number of bubbles have been deleted from the array. In such embodiments, the frusto-conical apertures 130 are pierced through both sides of the bubbles 119 such that moisture vapour may pass therethrough. However, in some other embodiments, the apertures 131 may be pre-formed on layers in either a patterned array or clustered to so as to line up with where bubbles 119 have been deleted or otherwise not formed in the array or as a uniform pattern wherein some of the pre-formed apertures 131 are sealed by an underlying bubble 119 and other pre-formed apertures 131 are open to allow moisture vapour to escape in the regions where the bubbles have been deleted, such as schematically shown in FIGS. 20 to 22. It should be noted that the number of frusto-conical apertures 130 and apertures 131, the size of the frusto-conical apertures 130 and apertures 131 as well as the array pattern of the frusto-conical apertures 130 and apertures 131 provided in various embodiments are dependent on the desired moisture transference across the frusto-conical apertures 130 and apertures 131.

As indicated above, some the apertures are provided as a frusto-conical shape so as to substantially provide one-way moisture transference; that being more moisture egress than ingress across the insulative layer. In such instances the larger open end of the frusto-conical aperture, as shown in FIGS. 3A, 3B, 4A, and 19, for example, is oriented proximal the surface 3 of the object (also shown in FIG. 19). The smaller open end of the frusto-conical aperture 130 is thus oriented toward the exterior of the object or distal to the surface 3 in use. In providing frusto-conical apertures 130 are orientated relative an object 1 with the narrower apex opening of the frusto-conically shaped apertures 130 are oriented away from the object surface 3, a substantially one-way moisture vapour transference aperture is provided. In some embodiments, apertures 131, such as shown in FIGS. 3B and 20 to 22 are provided in at least the layer of the bubble pack assemblies to be oriented, in use, away from the object surface 3. Apertures 131 may be pre-formed, such as shown, for example, in relation to the apparatus of FIG. 18 prior to completing the lamination production of the bubble-pack assemblies 100 according to the various embodiments disclosed herein. Furthermore, in forming apertures 131, these apertures may be formed by, for example, the use of hot-needle melt, punching or other means so as to produce apertures 131 as a simple hole with no angled side walls. Thus, apertures 131 differ from the frusto-conical apertures 130 in that the frusto-conical apertures 130 have a proximal opening 133 and a distal opening 134 with a continuous perimeter aperture wall extending therebetween, where the frusto-conical aperture wall 132 is substantially linear and inclined between the proximal opening 133 and the distal opening 134 such the proximal opening 133 has a greater area than the distal opening 134. For example, the shape of the frusto-conical apertures 130 and the inclined sidewalls is generally shown in FIGS. 3A, 3B, 6 and 20 to so as to provide a better understanding of the invention made and this disclosed.

Aluminum foil 102 has a low emissivity value of less than 5% on each surface to essentially eliminate heat transfer by radiation thus making it desirable for use in the reflective metalized polymeric insulative layer.

Each of the single bubble-pack layers 112, 114 provides both thermal conduction and convection insulation, and, in combination with the aluminum surfaces, excellent radiation insulation.

The composite bubble-pack 100 offers significant resistance to heavy loading whereby appreciative non-breakage of the air bubbles is often found. Preferably, outer layers 128 are made slightly thicker than inner layers 116 to better resist abrasion. Additional water resistance or abrasion resistant films may be bonded, formed or laminated to layer 128.

Further, in consequence that the composite assemblies of the instant disclosure may have better thermal R-values than prior art assemblies, thinner or higher insulative assemblies may be provided.

Figure 4:
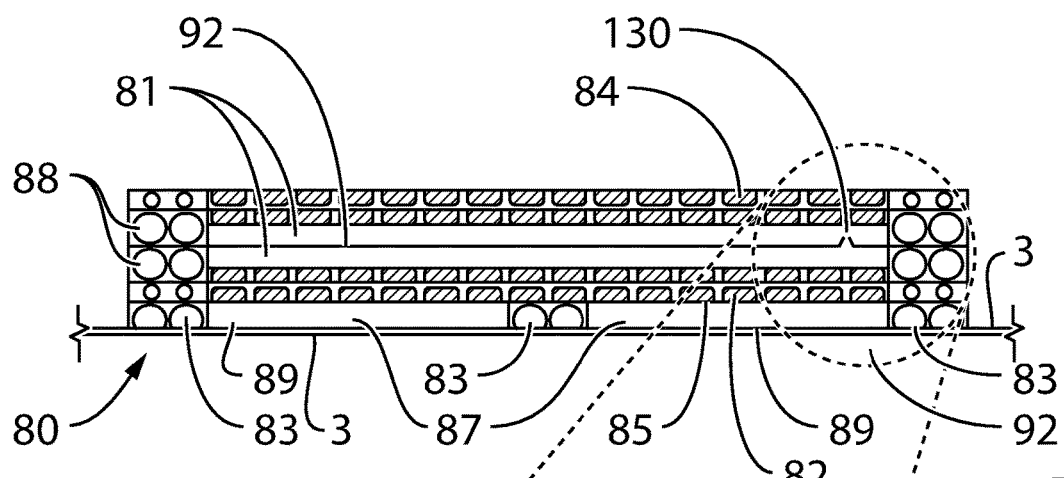

FIG. 4 shows a bubble pack generally as 80 having a pair of insulative air chambers 81 created by inner spacers 88 laminated to individual bubble packs 82, 84.

The assembly of FIG. 4, for example, also has a plurality of external spacers 83 adhered to outer layer 85 to define with layer 85, open cavities 87 which may be located adjacent the object surface 3. Assembly 80 has a pair of aluminum laminate or metalized films 92 adhered together. Additionally, in such an embodiment as shown in FIG. 4, frusto-conical apertures 130 as described above may also be provided so as to extend across the pair a metalized films 92 such that the inner insulative air chambers 89 are thus placed in in fluid communication. In some embodiments, although not shown for simplicity, the assembly of FIG. 4 may be provided with apertures 131 in the various layers not to be located adjacent the object 1, in addition to the frusto-conical apertures 130.

Figure 4A:
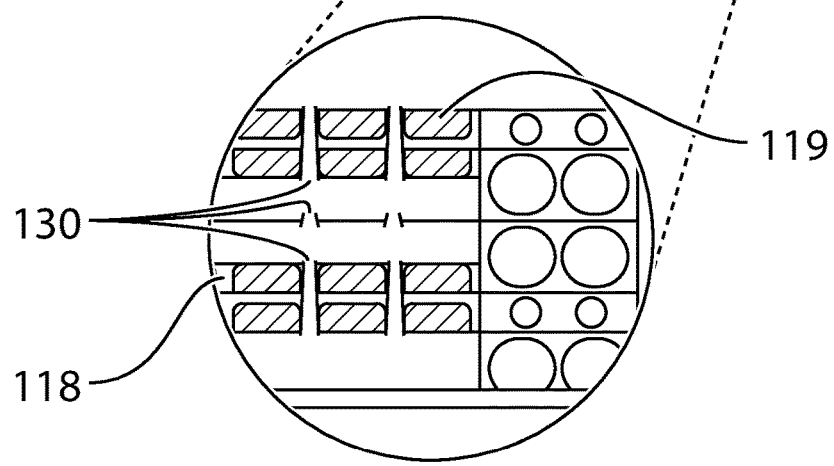
FIG. 4A is an exploded diagrammatic cross-sectional view of a portion of FIG. 4 showing insulative air chamber apertures.

Furthermore, with reference to FIG. 4, in particular the exploded view portion, FIG. 4A, of an exemplary insulative assembly, the location of the frusto-conical insulative air chamber apertures 130 are shown in alignment interposed in the spaces 118 between bubbles 119.

With reference to FIGS. 5 to 16 the following numerals denote the same materials throughout the drawings, as follows with reference to various exemplary metalized bubble-pack insulative layer arrangement's:
12—48 gauge aluminum metalized polyester (PET) film;
14—adhesive;
16—1.2 ml polyethylene film;
18—2.0 ml polyethylene film (bubbled);
19—fabric layer
20—1.2 ml ethylene vinyl acetate-polyethylene film;
22—2.0 ml polyethylene film;
24—aluminum foil;
26—polyester scrim; and
130—aperture.

Figure 5:
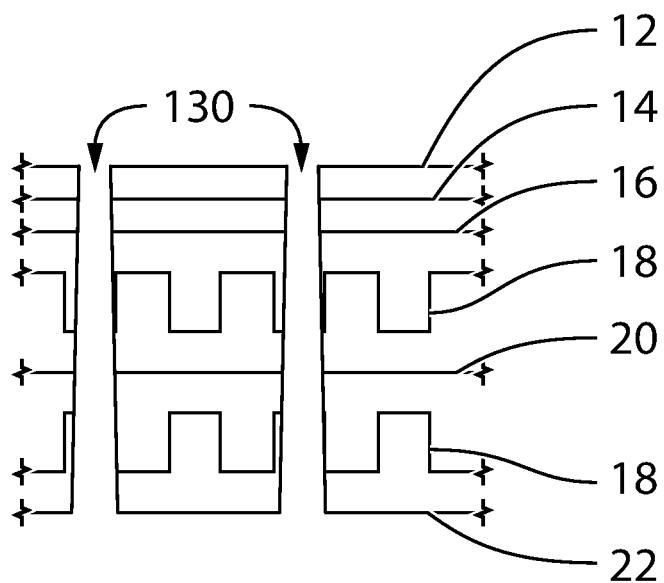
FIGS. 5 to 16 represent diagrammatic, exploded sectional views of bubble pack assemblies of use in the practice of the invention; and wherein the same numerals denote like parts.
Figure 6:
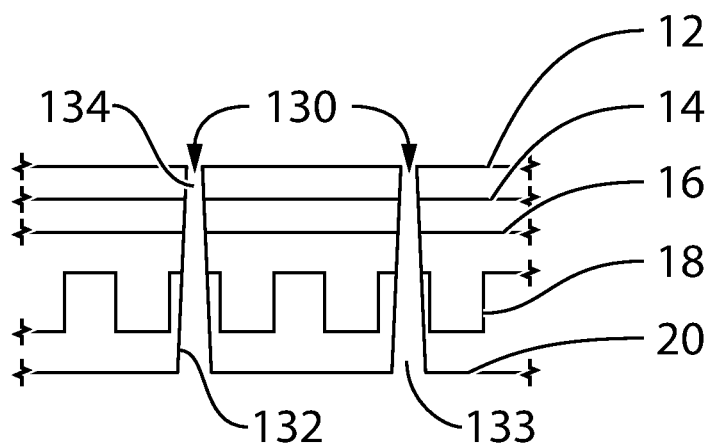
Figure 7:
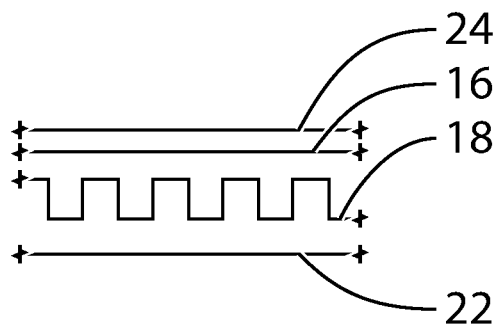
Figure 8:
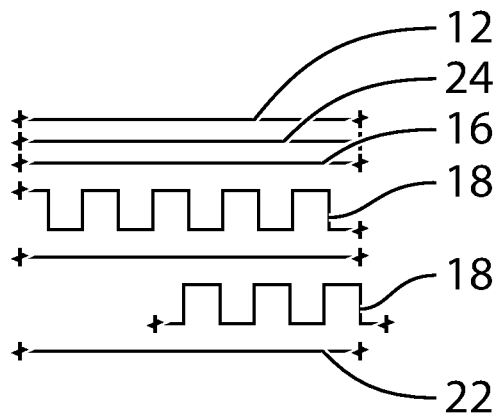
Figure 9:
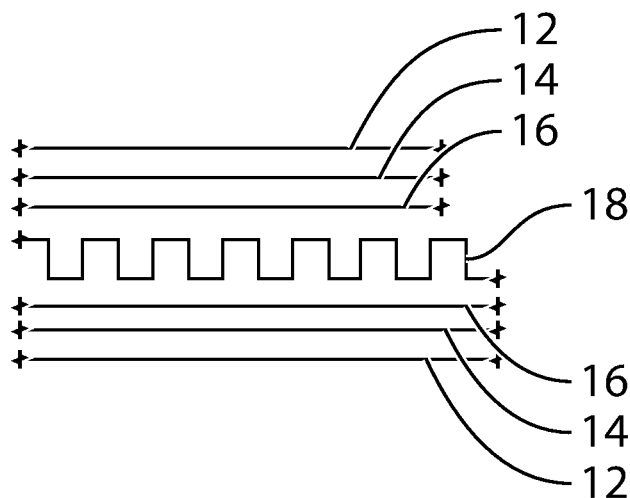
Figure 10:
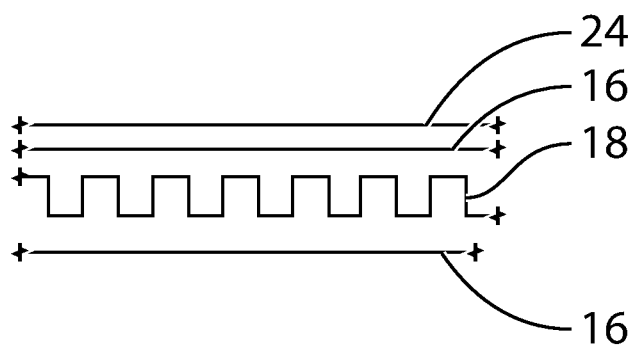
Figure 11:
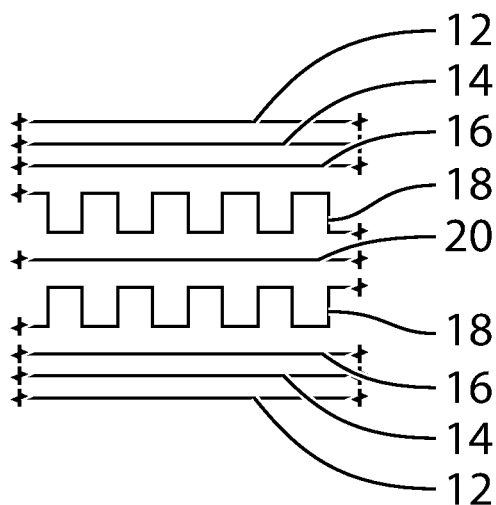
Figure 12:
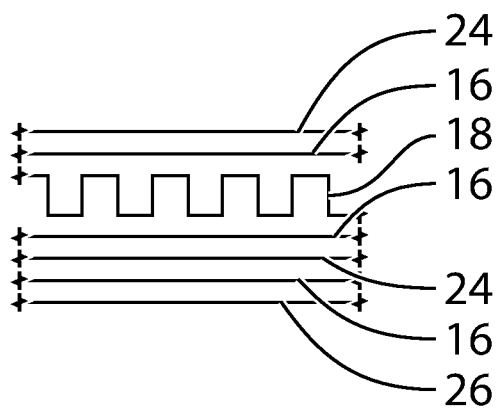
Figure 13:
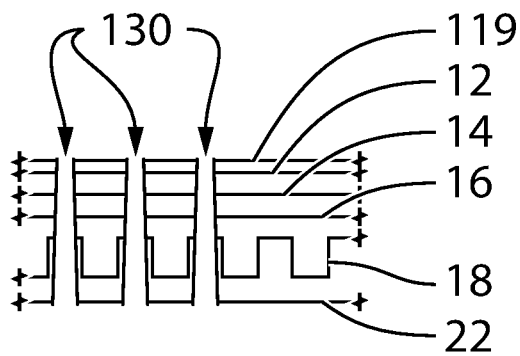
Figure 14:
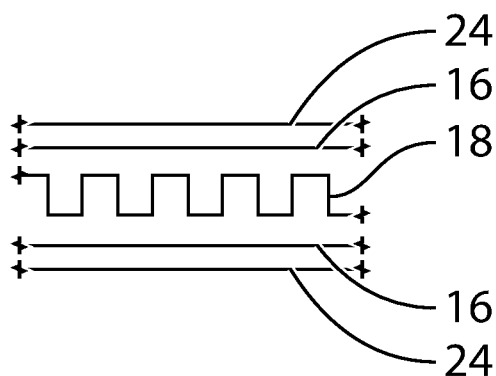
Figure 15:
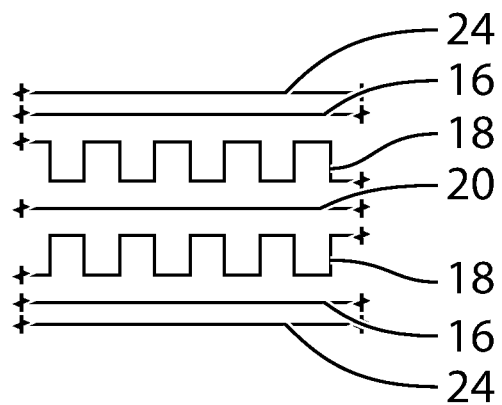
Figure 16:
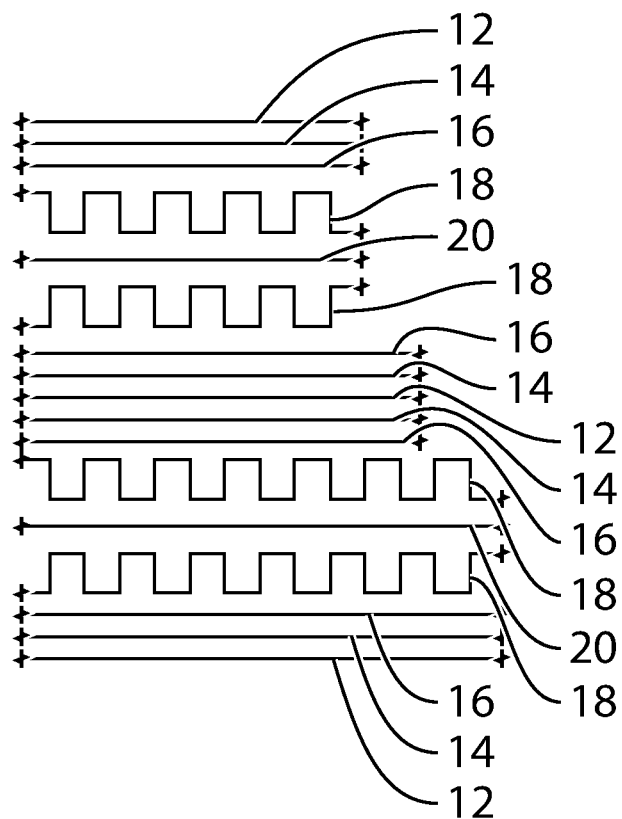

FIGS. 5, 6 and 13 show exemplary frusto-conical apertures 130, in exemplary arrangements. It should be noted that FIGS. 5 to 16 are provided for the purposes of detailing exemplary arrangements of the layers comprising the insulative assembly. Although not shown in all figures, frusto-conical apertures 130 are placed, as noted above interposed between the bubbles so formed so as to allow the substantially one-way passage of moisture vapour across the insulative assembly. In some embodiments, although not shown in FIGS. 5 to 16 for simplicity, apertures 131 may be additionally be provided on layers comprising the bubble-pack assemblies nearer the distal openings 134 of the frusto-conical apertures 130, such as the relative location as shown in FIG. 20. Additionally, in some embodiments, so as to attain a desired number of apertures for certain applications, a portion of bubbles 119 may be pierced on both sides so as to increase the number of apertures 130 per unit area of the bubble pack and reduce the number of insulative intact bubbles and thus allow substantially one-way moisture vapour transference. Also, as noted above, in some embodiments, such as which may be formed by the exemplary apparatus of FIG. 18, a predetermined number of bubbles 119 and array thereof may be deleted from production of the bubble-pack assemblies or otherwise not formed thus allowing for an increase in the number of apertures 130 per unit area of the bubble-pack and reduce the number of insulative intact bubbles, thus allowing substantially one-way moisture vapour transference.

The bubble pack layer is preferably of a thickness selected from 0.5 cm to 1.25 cm. The other polyethylene layers are each of a thickness, preferably, selected from 1 to 6 ml s.

In another aspect of the disclosure, there is provided an exemplary apparatus for producing reflective metalized polymeric insulation materials having apertures for the substantially transference of moisture vapour therethrough. Furthermore, the frusto-conical apertures 130 are formed so as to provide substantially a one-way moisture vapour transference passage. With reference to FIG. 17, there is provided an exemplary apparatus for producing the reflective metalized polymeric insulation material, for example, that shown in FIG. 9, although in the absence of the adhesive layer 14, which may be optional. The frusto-conically shaped apertures 130 are not shown in FIG. 9 for simplicity. The apparatus, generally shown at 300, has an endless movable conveyor mold shown generally as 310 into which a sheet of metalized polyester 12, a first sheet of polyethylene film 16 and a second sheet of polyethylene film 18 are fed in a layered arrangement and move in the direction as shown by A. A preheater (not shown) softens the first sheet or layer of polyethylene film 16, and in some instances the second sheet or layer of polyethylene film 18 to just below the melt temperature thereof, for example, 136° C. to 140° C. for polyethylene, so as to allow bonding of layers. The molds 310, made, in some instances from aluminum, have a plurality of spaced apart elongate members 322 movable by means of terminal rotating cog and sprocket assemblies (not shown). Each of the members 322 has portions defining semi-spherical cavities 324 intermittent along the width of the member 322 and, in some instances, offset to adjacent cavities 324 on adjacent members 322. Each of the cavities 324 has a passage 326 to provide suctional forces on the softened film for pulling the film under suction onto the inside of the cavity surface, by way of a vacuum pump (not shown).

A first nip roller 318 is located to apply pressure so as to bond and complete the sealing of the metalized polyester film 12 to the first sheet of polyethylene film 16 and also seal the first sheet of polyethylene film 16 to the second sheet of polyethylene film 18 once the bubbles 119 are formed, thus forming an intermediate portion of the reflective metalized polymeric cavity-filled bubble insulation assembly 338 with enclosed bubbles 119.

The size, shape and arrangement of the cavities or bubbles 119 in the films may be as suitably determined by the skilled person. Furthermore, the temperatures used to soften the polymeric films 16 and 18 as well as the film throughput rate can be readily selected by the skilled person, however throughput rates of about 50 meters/minutes are preferred in some embodiments.

Once the intermediate portion of the reflective metalized polymeric cavity-filled bubble insulation assembly 338 is formed, as described for exemplary purposes above, a third sheet or layer of polymeric film 19 and metalized polyester 12a are applied to the curved side of the bubbles 119. The third layer of polymeric film 19 and a second metalized polyester sheet or layer 12a enter the system substantially as shown in FIG. 17 and move in the direction shown at B. A second nip roller 330 applies pressure so as to bond the third layer of polyethylene film 19 having adhered thereto the second layer of metalized polyester film 12a to the curved side of the bubble 119. At this stage preheater (not shown) may be used, similar to that as noted above, to soften the polyethylene film 19, or films 16, 18 and 19, to just below the melt temperature thereof, for example, 136° C. to 140° C., for polyethylene, such that the metalized polyester 12a may be adhered thereto and also to aid in adhering the polymeric film 19 to the curved side of the bubbles 119. Once the third polymeric film layer 19 and the second metalized polyester layer 12a are adhered, the reflective metalized polymeric cavity-filled bubble insulation assembly 338 is completed, in the exemplary embodiment noted herein.

In order to form the frusto-conical apertures 130 between in the spaces 118 interposed between the bubbles 119, a frusto-conical aperture forming roller 332 is provided. In some instances, the frusto-conical aperture forming roller 332 is provided for co-operation with the second nip roller 330 wherein a degree of pressure is provided between the second nip roller 330 and the frusto-conical aperture forming roller 332. The frusto-conical aperture forming roller 332 has a plurality of projections 334a, which may be heated, provided at locations about the circumference thereof for making frusto-conical apertures 130 through at least some of the spaces 118. Although not shown, in some embodiments, the projections may be aligned to pierce a portion of the bubbles. However, in preferred embodiments the projections 334a are provided as non-heated, needle-like projections which pierce through the layers of the reflective metalized polymeric cavity-filled bubble insulation assembly 338 to provide apertures 130, as shown in FIG. 17. The needle-like projections 334a are preferred because when the projection pierces the reflective metalized polymeric cavity-filled bubble insulation assembly 338 at the location of the spaces 118 interposed between bubbles 119, substantially frusto-conical apertures 130 are formed. Such frusto-conical apertures 130 are preferred owing the property of being able to provide a substantially one-way moisture vapour transference when the reflective metalized polymeric cavity-filled bubble insulation assembly 338 is utilized against a surface requiring substantially one-way moisture vapour transference.

With specific reference to the apparatus 300 shown in FIG. 17, the endless molds shown 310, the first nip roller 318, the second nip roller 330, and frusto-conical aperture forming roller 332 move in a synchronized fashion such that as the reflective metalized polymeric cavity-filled bubble insulation assembly 338 is produced, the projections 334a are aligned with the spaces 118 interposed between the bubbles 119 so as to form the apertures 130, while not piercing bubbles. Furthermore, projections 334b may be provided in an array to produce clusters of frusto-conically shaped apertures 130, such as shown, for example, in FIG. 22.

Turning now to FIG. 18, as similar exemplary apparatus 302 to that shown in FIG. 17 is provided for producing reflective metalized polymeric insulation materials having apertures for allowing substantially one-way transference of moisture vapour therethrough. The apparatus generally shown at 302 functions similar to apparatus 300 discussed above. However, in apparatus 302, second nip roller 330 has a plurality of projections 334b located about the periphery thereof for forming frusto-conical apertures 130 or apertures 131 in some of the layers, for example that comprising the second metalized polyester layer 12a and the third polymeric film layer 19 prior to completing the lamination of a reflective metalized 0 or apertures 131, or combination thereof produced by projections 334b, are pre-formed in the layers, for example that comprising the second metalized polyester layer 12a and the third polymeric film layer 19. Such a layer with pre-formed the frusto-conical apertures 130 or apertures 131 may also be made and fed through an apparatus 300 having a second nip roller 330 similar to that of FIG. 17, that being devoid of projections 334b. FIGS. 20 to 22 show an exemplary embodiment of a reflective metalized polymeric cavity-filled bubble insulation assembly 338 made by apparatus 302 where the frusto-conical apertures 130 or aperture 131 are pre-preformed. In some embodiments, projections 334b be provided as heated needles or punches so as to provide apertures 131, as discussed above. Furthermore, with reference to the apparatus of FIG. 18 and the embodiments shown in FIGS. 20 to 22 it may be desirable in some embodiments to plug a certain number of the semi-spherical cavities 324 intermittent along the width of the member 322, as shown schematically at plug 325 so as to inhibit the suctional forces provided from a corresponding passage 326 from drawing in a portion of the polymeric film and producing a bubble 119 at the corresponding location, thus resulting a deleted bubble, as noted above. The array and number of cavity plugs 325 may be determined accordingly the needs and environment where the resultant bubble-pack assembly it to be used and the amount of moisture transference required for a given application. Alternatively, to providing plugs 325, the spaced apart elongate members 322 may be provided with an array of semi-spherical cavities 324 corresponding to desired bubble pattern array. Both alternatives provide for a bubble array, such as that shown for example in FIGS. 20 to 22 where a desired portion of bubbles 119 have been effectively deleted.

With respect to embodiments, such as those discussed above in relation apparatus 302 and plugs 325 for inhibiting suctional forces into certain ones of the semi-spherical cavities 324 or the semi-spherical cavity 324 array alternatively discussed above, the pattern of the projections 334a provided on the frusto-conical aperture forming roller 332 may be provided, and in preferred embodiments, such that the frusto-conical apertures 130 are formed in the areas where the bubbles have been deleted for example, as clusters. FIGS. 22 to 22 shown an exemplary pattern of frusto-conical apertures 130 formed by such a projection pattern provided to frusto-conical aperture forming roller 332

Figure 19:
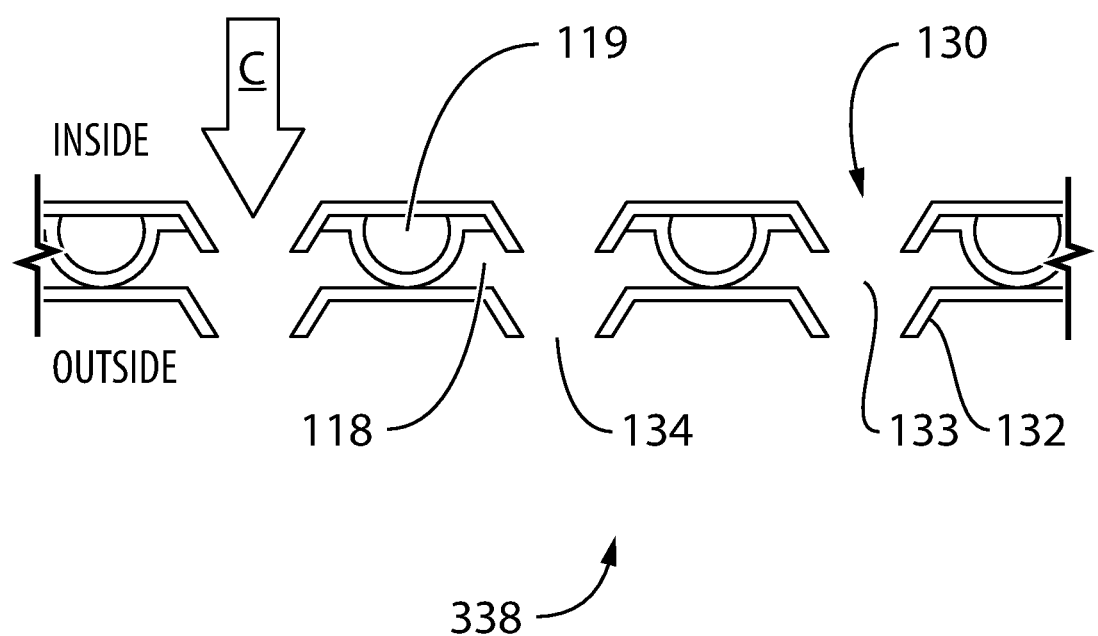
FIG. 19 is a schematic side view of section of an exemplary reflective metalized polymeric cavity-filled bubble insulation assembly having apertures formed therein which may formed by the schematically shown apparatus of FIG. 17.

As shown schematically in FIG. 19, a sectional side view of a formed section of reflective metalized polymeric cavity-filled bubble insulation assembly 338 is provided. In use the reflective metalized polymeric cavity-filled bubble insulation assembly or radiant barrier 338 is oriented such that the side having the broader opening of the frusto-conical apertures 130 is located adjacent an object surface 3 and thus the side having the narrower apex opening of the frusto-conical apertures 130 is oriented away from the object surface 3. In such an orientation, the larger opening of the frusto-conically shaped apertures 130 is thus oriented toward the object surface 3. Moisture vapour is therefore permitted to pass through apertures 130 along a path denoted by the arrow C. This is also shown in FIG. 20, for exemplary purposes. Owing to the frusto-conical shape, the passage of moisture is allowed to pass through the apertures in substantially one direction only thereby reducing dampness as may be emitted from an object. Also, the frusto-conical shape of the apertures reduces the transference of air, and vapours contained therein, from the outside of the object 1 to the inside of the object, thus providing a net insulative effect with means to allow moisture vapour to escape from inside the object.

FIGS. 20 to 22 show an exemplary embodiment of a section of a reflective metalized polymeric cavity-filled bubble insulation assembly where a predetermined number and array of bubbles 119 have been deleted or not formed. The number of formed bubbles 119, and size thereof, may be determined as required for a given application. For example, as shown schematically in FIG. 21, every fourth bubble has been deleted or not otherwise not formed. However, as noted above, the array of formed bubbles, as well as the size of the frusto-conical apertures 130 and/or apertures 131 may be determined for a given application so as effect substantially one-way moisture vapour transference. FIG. 21 shows a top plan view of a section of a reflective metalized polymeric cavity-filled bubble insulation assembly or sheet where the layer to be oriented away from the object surface 3 has been punctured therethrough a plurality of apertures 131 which may be pre-formed utilizing the exemplary apparatus of FIG. 18. Frusto-conically shaped apertures 130 are not shown in FIG. 21 for simplicity. In the embodiment shown, certain ones of the pre-formed frusto-conical apertures 130 (not shown for simplicity) and/or apertures 131 in this layer may be sealed from allowing moisture vapour transference by an underlying bubble 119, whereas pre-formed frusto-conical apertures 130 (not shown for simplicity) and/or apertures 131 in regions where bubbles 119 have not been formed allow for moisture vapour transference. Turing now to FIGS. 20 and 22, the side of the reflective metalized polymeric cavity-filled bubble insulation assembly which, in use, is to be oriented towards the object surface 3 is shown. In the layers to be oriented toward the object surface 3, frusto-conical apertures 130 are provided where the proximal opening 133 is oriented towards the object surface 3 and the distal opening 134 away therefrom. Furthermore, the side to be in use located adjacent the object 1 surface 3, as shown in FIG. 22, the frusto-conical apertures 130 are formed in regions of the reflective metalized polymeric cavity-filled bubble insulation assembly devoid of bubbles 119. Thus, moisture vapour may cross from the object surface 3 to the reflective metalized polymeric cavity-filled bubble insulation assembly, enter via the frusto-conical apertures 130, across the assembly and exit via the opposing frusto-conical apertures 130 or apertures 131 so as to effect substantially one-way moisture vapour transference.

For example, in some embodiments, the apertures are provided, as noted above, in such a number and array so as to allow from about 0.020 to about 0.040 perms (gr/ft$^2$·h·(in.Hg)) and from about 0.0085 to about 0.0200 Water Vapour Transmission (gr/h·ft$^2$), when tested accordingly the protocols of the ASTM test Method E 96-05. In preferred embodiments, the apertures are provided such a number and array so as to allow 0.027 perms. Additionally, the apertures may be provided in preferred embodiments, so as to form, on the average, about 25 apertures/in$^2$ while maintaining the preferred 0.0207 perms.

Figure 23A:
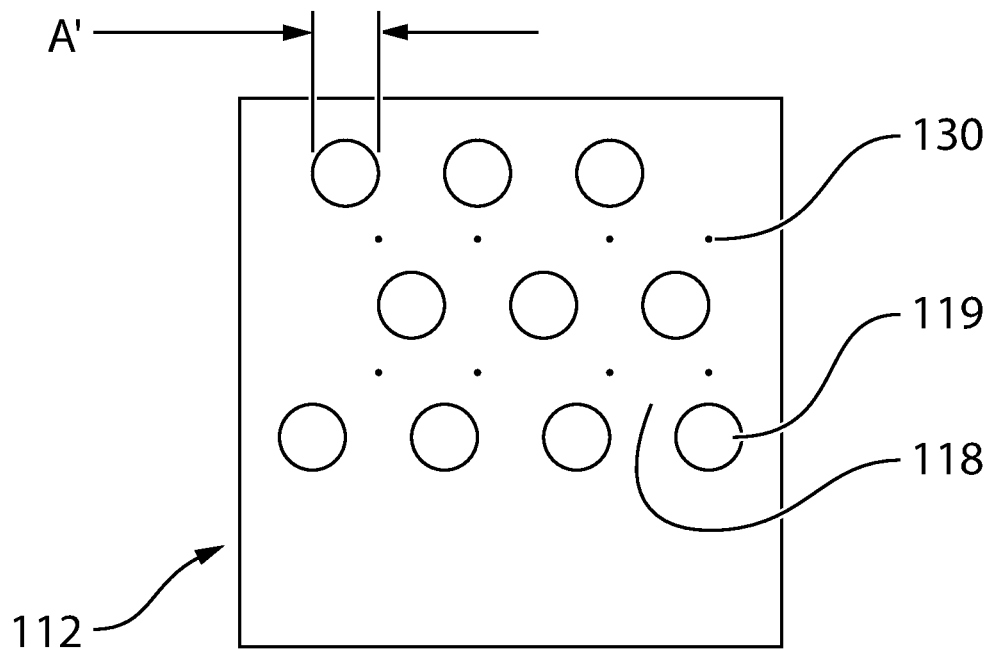
FIGS. 23A, 23B, and 23C are diagrammatic top plan views of exemplary configurations of apertures located in various exemplary embodiments of the insulative bubble packs of the instant disclosure.
Figure 23B:
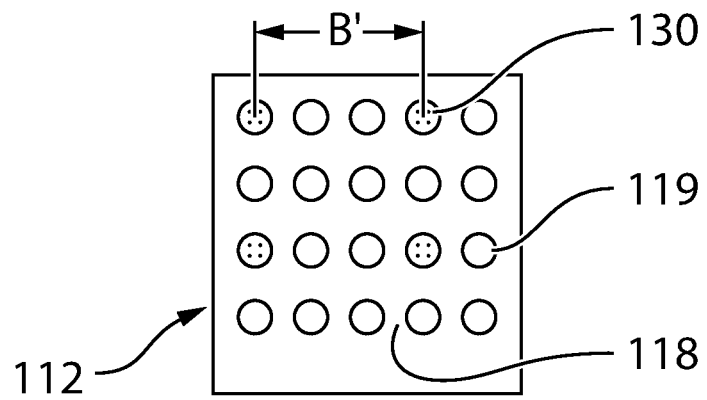
Figure 23C:
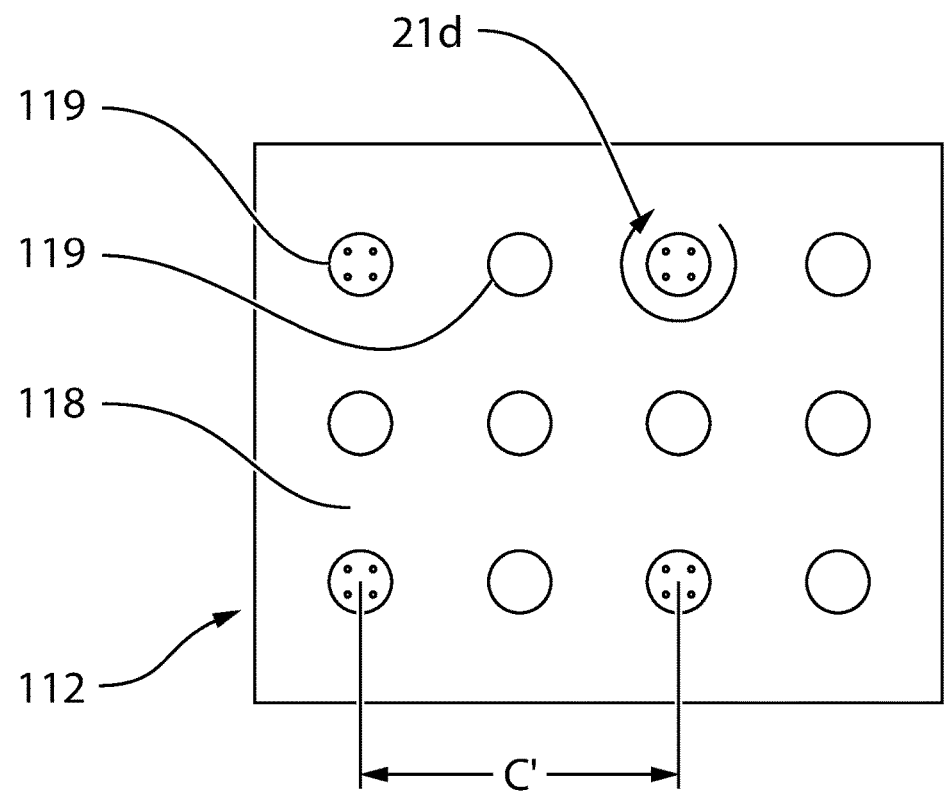
Figure 23D:
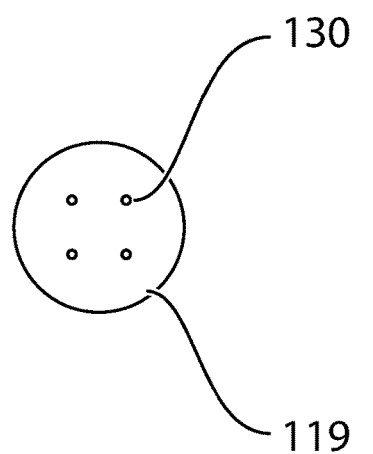
FIG. 23D is an exploded diagrammatic top plan view of a portion of FIG. 23C showing apertures located through a bubble.

According to various embodiments, envisioned and disclosed herein, the number, array and size of the apertures 130 is dependent on the desired moisture vapour transference and the required insulating properties of an item made using the bubble packs disclosed herein. For example, FIGS. 23A, 23B, and 23C show various exemplary embodiments and aperture 130 patterns in bubble packs having about 0.47 cm (3/16") diameter bubbles. Of course, for various applications, bubble packs having larger or smaller bubble sizes may be used. FIG. 23A shows a bubble pack having bubbles 119 of about 0.47 cm (3/16") defined by A'. In this embodiment, apertures 130 are made in the spaces 118 interposed between the bubbles 119. In FIG. 23B, the same bubble pack as is FIG. 23A is shown, however, four apertures 130 are shown being located in pattern of every two bubbles 119 wherein the bubbles have apertures 130 which have been pierced through on both sides so as to allow moisture vapour transference (see FIG. 23E). The spacing between the pierced bubbles as shown in FIG. 23B is shown at B' and is about 4.45 cm (1¾"), on centre. Similarly, FIG. 23C shows a bubble pack with four apertures 130 located in every other bubble, thus having a spacing of C' of about 2.15 cm (⅞"). Although only four apertures 130 are shown in the bubbles 119 in FIGS. 23B and 23C, and one aperture 130 interposed between the bubbles 119 in FIG. 23A for simplicity and purposes of illustration only, more or less apertures may be provided depending on the desired application and spacing available so as to produce the number of apertures and desired moisture vapour transference. Furthermore, the size of the frusto-conical apertures 130 may be from about 0.3 mm (1/64") to about 1.5 mm (1/16") and preferably, about 0.79 mm (1/32"). Such aperture sizes are provided for the exemplary purposes only and one of skill in the art may realize that different aperture sizes may be required or desired depending on a given application and the desired amount of moisture vapour transference.

EXAMPLES

Samples of the thermally insulating reflective metalized polymeric insulation material having apertures therein were tested to determine air permeance, water pressure withholding and water vapour permeance. Given that a thermally insulating reflective metalized polymeric insulation material is non-porous, no air, water or water vapour will pass therethrough until apertures, such as in various embodiments of the instant disclosure, are formed therein. Accordingly, the tested embodiments of the thermally insulating reflective metalized polymeric insulation material having apertures formed therein are shown in the figures. FIG. 6 shows schematically a cut-away side view of an exemplary embodiment of the thermally insulating reflective metalized polymeric insulation material having apertures form therein used in the testing process. With regard the aperture pattern and number of apertures specifically, FIGS. 23A to 23C schematically show the tested embodiments in the following examples where, samples A1 to A3 correspond to the embodiment shown in FIG. 23A, samples B1 to B3 correspond to the embodiment shown in FIG. 23B and samples C1 to C3 correspond to the embodiment shown in FIG. 23C. The average size each aperture was about 0.79 mm (1/32").

Example 1

The samples noted above were tested using the ASTM D737 (2012) test for Air Permeability of Textile Fabrics.

Briefly, this standardize test is used to measure the air permeability of textile fabrics and can also be applied to woven fabrics, nonwoven fabrics, air bag fabrics, blankets, napped fabrics, knitted fabrics, layered fabrics, and pile fabrics. The fabrics may be untreated, heavily sized, coated, resin-treated, or otherwise treated.

TABLE 1

| Sample | CFM/ft$^2$ |
|---|---|
| A1 | 1.93 |
| A2 | 1.90 |
| A3 | 2.21 |
| Average A | 2.015 |
| B1 | 1.35 |
| B2 | 1.41 |
| B3 | 1.35 |
| Average B | 1.372 |
| C1 | 2.03 |
| C2 | 2.07 |
| C3 | 1.81 |
| Average C | 1.971 |

Table shows that the embodiment shown in FIG. 23A, on average has an air permeability of 2.015 Cubic Feet per minute per square foot (CFM/ft$^2$) of reflective metalized polymeric insulation material having apertures form therein, whereas the embodiments shown in FIGS. 23B and 23C on average had an air permeability of 1.37 CFM/ft$^2$ and 1.971 CFM/ft$^2$. Therefore, the data shows that more air permeability of the reflective metalized polymeric insulation material is achieved by forming the frusto-conical apertures in the spaces interposed between the bubbles as opposed to through the bubbles. Interestingly, the embodiment shown in FIG. 23A has the least number of apertures per unit area.

Example 2

The samples noted above were also tested using the AATCC 127 Water Pressure test. This standardized test measures the resistance of a fabric to the penetration of water under hydrostatic pressure. This test can be used to measure the water penetration for all type of fabrics including those treated with a water resistant or repellant finish.

TABLE 2

| Sample | mbar |
|---|---|
| A1 | 9.0 |
| A2 | 8.5 |
| A3 | 8.5 |
| Average A | 8.7 |
| B1 | 7.0 |
| B2 | 7.5 |
| B3 | 7.5 |
| Average B | 7.3 |
| C1 | 8.0 |
| C2 | 7.5 |
| C3 | 7.5 |
| Average C | 7.7 |

This testing data shows that the samples shown in the embodiment of FIG. 23A had the highest resistance to water penetration under pressure with an average penetration pressure of 8.7 mbar compared to an average of 7.3 mbar and 7.7 mbar for the embodiments shown in FIGS. 23B and 23C, respectively.

Example 3

The samples noted above were also tested for water vapour permeance using the ASTM test Method E 96-05. Briefly, this standardized test is used for determining the water vapor transmission (WVT) of materials through which the passage of water vapor may be of importance, such as paper, plastic films, other sheet materials, fiberboards, gypsum and plaster products, wood products, and plastics.

TABLE 3

| Sample | US Perms (gr/ft$^2$ · h · (in. Hg) |
|---|---|
| A1 | 7 |
| A2 | 7 |
| A3 | 7 |
| Average A | 7 |
| B1 | 3 |
| B2 | 3 |
| B3 | 4 |
| Average B | 3.4 |
| C1 | 5 |
| C2 | 5 |
| C3 | 5 |
| Average C | 5 |

This testing data shows that the samples shown in the embodiment of FIG. 23A had the highest water vapour permeability with an average of 7 US Perms compared to an average of 3.4 US Perms and 5 US Perms for the embodiments shown in FIGS. 23B and 23C, respectively.

Figure 23E:
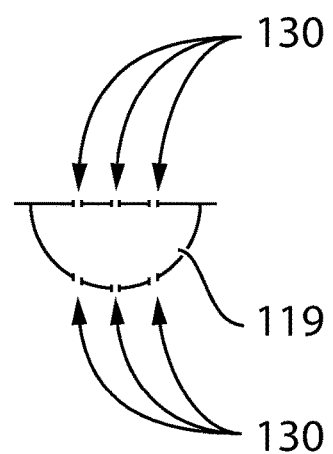
FIG. 23E is a cross-sectional view a pierced bubble of an embodiment of an insulative bubble pack of the instant disclosure.

In the three examples noted above, surprisingly, the embodiment shown schematically in FIG. 23A, that being the sample of the reflective metalized polymeric insulation material having apertures formed interposed between the bubbles had the greatest moisture vapour transference, yet also the greatest resistance to water penetration. The samples shown schematically in FIGS. 23B (Sample B) and 23C (Sample C), wherein the apertures are formed by way of popping a portion of the bubbles as shown in FIG. 23E, have more apertures per unit area than that of Sample A, yet, interestingly have less air and water vapour permeance. Samples B and C were also shown to be less resistant to water penetration thus suggesting that more moisture vapour transference and breathability for reflective metalized polymeric insulation material can be achieved by forming the frusto-conical apertures in the spaces interposed between the bubbles and not through popped bubbles. It should be noted, however, that all of test sample displayed both breathability and water vapour transference.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the products or processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. An object having an outer surface comprising a thermally insulating sheet of a reflective metalized polymeric insulation material located adjacent to said outer surface;

said reflective metalized polymeric insulation material comprising a first bubble pack assembly including a first thermoplastic film having a plurality of portions wherein each of said portions defines a cavity and a second thermoplastic film in sealed engagement with said first thermoplastic film to provide a plurality of closed-cell cavities;

said reflective metalized polymeric insulation material further characterized in having a plurality of frusto-conically shaped apertures suitably sized and interposed between said closed-cell cavities such that said thermally insulating sheet has the narrower dimension of each of said frusto-conically shaped apertures oriented distal to said outer surface so as to effect transference of moisture vapour through said frusto-conically shaped apertures from outer surface without substantial ingress of external air through the apertures, each of said plurality of frusto-conically shaped apertures being defined by a proximal opening and a distal opening with a continuous perimeter aperture wall extending therebetween, said aperture wall being substantially linear and inclined between said proximal opening and said distal opening such that said proximal opening has a greater area than said distal opening; and wherein within any thermally insulating layer of a reflective metalized polymeric insulation material having frusto-conically shaped apertures, the narrower dimension of each of said frusto-conically shaped apertures is oriented distal to said object.

2. The object as defined in claim 1, wherein said frusto-conically shaped apertures allow substantially one-way moisture vapour transference.

3. The object as defined in claim 1, wherein said frusto-conically shaped apertures are provided in an effective number and array so as to allow effective moisture transference.

4. The object as defined in claim 1, wherein said frusto-conically shaped apertures are also formed through a portion of said closed-cell cavities.

5. The object as defined in claim 1, wherein said reflective metalized polymeric insulation material comprises an assembly comprising said reflective metalized bubble pack; a second reflective metalized bubble pack; and a first plurality of intervening bubble spacers suitably located between said first and said second bubble packs so as to define at least one inner insulative air chamber between said first and second bubble packs.

6. The object as defined in claim 5, further including at least one insulative air chamber aperture for permitting the transference of moisture vapour across said at least one inner insulative air chamber.

7. The object as defined in claim 6, wherein said at least one insulative air chamber aperture allows substantially one-way moisture vapour transference.

8. The object as defined in claim 7, wherein said at least one insulative air chamber aperture is frusto-conically shaped.

9. The object as defined in claim 1, wherein said frusto-conically shaped apertures are formed through said first thermoplastic film any adjacently located metalizing layer; and a plurality of apertures formed through said second thermoplastic film.

10. The object as defined in claim 9, wherein said second thermoplastic layer has an adjacent second metalizing layer, said apertures also being formed through said second metalizing layer.

11. A thermally insulative sheet for surrounding an object or part thereof comprising a reflective metal polymeric bubble pack insulation assembly;

said reflective metal polymeric bubble pack insulation including a first thermoplastic film having a plurality of portions wherein each of said portions defines a cavity and a second thermoplastic film in sealed engagement with said first thermoplastic film to provide a plurality of closed-cell cavities;

said thermally insulative sheet further characterized in having a plurality of frusto-conically shaped apertures suitably sized and interposed between said closed-cell cavities such that the narrower dimension of each of said frusto-conically shaped apertures is oriented distal to the object so as to effect transference of moisture vapour through said frusto-conically shaped apertures from said object through said thermally insulative casing without substantial ingress of external air through the apertures, each of said plurality of frusto-conically shaped apertures being defined by a proximal opening and a distal opening with a continuous perimeter aperture wall extending therebetween, said aperture wall being substantially linear and inclined between said proximal opening and said distal opening such that said proximal opening has a greater area than said distal opening; and wherein within any of said reflective metal polymeric bubble pack insulation having frusto-conically shaped apertures, the narrower dimension of each of said frusto-conically shaped apertures is oriented distal to said object or part thereof.

12. The thermally insulative sheet as defined in claim 11, wherein said bubbles have diameter of greater than ½" and a height of greater than 3/16".

13. The thermally insulative sheet as defined in claim 11, wherein said bubbles have a diameter of less than ½" and a height of less than 3/16".

14. The thermally insulative sheet as defined in claim 11, wherein a reflective side of said reflective metal polymeric bubble pack insulation assembly is oriented to face toward a surface of said object or part thereof.

15. The thermally insulative sheet as defined in claim 11, wherein a reflective side of said reflective metal polymeric bubble pack insulation assembly is oriented to face away from a surface of said object or part thereof.

16. The thermally insulative sheet as defined in claim 11, further comprising a second reflective metal polymeric bubble pack assembly in communication with said reflective metal polymeric bubble pack insulation; and a first plurality of intervening bubble spacers suitably located between said first and said second reflective metal polymeric bubble packs so as to define at least one inner insulative air chamber between said first and second reflective metal polymeric bubble packs.

17. The thermally insulative sheet as defined in claim 16, said reflective metal polymeric bubble pack insulation assembly further including at least one insulative air chamber aperture for permitting the transference of moisture vapour across said at least one inner insulative air chamber.

18. The thermally insulative sheet as defined in claim 17, wherein said at least one insulative air chamber aperture is frusto-conically shaped.

19. The thermally insulative sheet as defined in claim 11, wherein said frusto-conically shaped apertures are formed through said first thermoplastic film any adjacently located metalizing layer; and a plurality of apertures formed through said second thermoplastic film.

20. The thermally insulative sheet as defined in claim 19, wherein said second thermoplastic layer has an adjacent second metalizing layer, said apertures also being formed through said second metalizing layer.

* * * * *